United States Patent
Smith et al.

(10) Patent No.: US 6,906,878 B2
(45) Date of Patent: Jun. 14, 2005

(54) METHOD AND SYSTEM FOR IMPLEMENTING IN SITU LOW FLYHEIGHT WARNING

(75) Inventors: Gordon James Smith, deceased, late of Rochester, MN (US); by Molly Smith, legal representative, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 10/219,893

(22) Filed: Aug. 15, 2002

(65) Prior Publication Data

US 2004/0032681 A1 Feb. 19, 2004

(51) Int. Cl.[7] .............................. G11B 27/36; G11B 5/09
(52) U.S. Cl. ............................................. 360/31; 360/53
(58) Field of Search .............................. 360/25, 31, 75

(56) References Cited

U.S. PATENT DOCUMENTS

| | | | | |
|---|---|---|---|---|
| 5,220,466 A | * | 6/1993 | Coker et al. | 360/46 |
| 5,377,058 A | * | 12/1994 | Good et al. | 360/75 |
| 5,410,439 A | * | 4/1995 | Egbert et al. | 360/75 |
| 5,497,085 A | * | 3/1996 | Tian et al. | 324/212 |
| 5,999,360 A | | 12/1999 | Meyer et al. | 360/77.02 |
| 6,046,596 A | | 4/2000 | Schaenzer et al. | 324/662 |
| 6,191,901 B1 | * | 2/2001 | Carlson et al. | 360/31 |
| 6,301,797 B1 | * | 10/2001 | Sundaram et al. | 33/645 |
| 6,411,458 B1 | * | 6/2002 | Billings et al. | 360/75 |
| 6,570,730 B1 | | 5/2003 | Lewis et al. | 360/75 |
| 2001/0050826 A1 | | 12/2001 | Helsel et al. | |

FOREIGN PATENT DOCUMENTS

| | | |
|---|---|---|
| EP | 0 605 343 A2 | 7/1994 |
| EP | 0 962 932 | 12/1999 |

* cited by examiner

Primary Examiner—David Hudspeth
Assistant Examiner—Glenda P. Rodriguez
(74) Attorney, Agent, or Firm—Joan Pennington

(57) ABSTRACT

A method and apparatus are provided for implementing in situ low flyheight warning in a direct access storage device (DASD). For each head in the DASD, a readback amplitude ratio is identified from two different disk radii. The initial ratio value is stored for each head in the DASD. During operation of the DASD, readback amplitude is monitored and an operating readback amplitude ratio is identified from two different disk radii. A change between the initial ratio value and the operating readback ratio is calculated and compared with a threshold value to identify a low-flying slider. A warning is generated responsive to the change value being greater than the threshold value.

11 Claims, 7 Drawing Sheets

ID/OD DIFFERENCE FOR SLIDING CONTACT

METHOD AND SYSTEM FOR IMPLEMENTING IN SITU LOW FLYHEIGHT WARNING

FIELD OF THE INVENTION

The present invention relates generally to the data processing field, and more particularly, relates to a method and apparatus for implementing in situ low flyheight warning in a direct access storage device.

DESCRIPTION OF THE RELATED ART

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads mounted on air bearing sliders, are driven in a path toward and away from the drive axis, write data to the disks and read data from the disks.

In disk drives or direct access storage devices (DASDs), the continuing increases in data storing capacities are accomplished by increasing linear recording densities and track densities. To provide an adequate signal-to-noise ratio (SNR) of the readback signal, the nominal head to disk spacing is reduced. This decreased head to disk spacing can significantly increase the occurrences of head to disk interactions and the probability of a terminal head crash.

Currently various methods and arrangements are used to measure head flyheight including harmonic ratio flyheight (HRF), a clearance change detector (CCD), and generalized error measurement (GEM). Some of the disadvantages of the conventional methods include the sensitivity to track misregistration (TMR) and that dedicated pre-written test tracks are required. Current methods that use dedicated test tracks cannot measure sliding contact correctly because of TMR. Also current methods, such as GEM FH, require significant processing of data obtained from pre-written test tracks.

A need exists for a method and apparatus for in situ detection of low flyheight and for implementing in situ low flyheight warning.

SUMMARY OF THE INVENTION

A principal object of the present invention is to provide a method and apparatus for implementing in situ low flyheight warning. Other important objects of the present invention are to provide such method and apparatus for implementing in situ low flyheight warning substantially without negative effect and that overcome many of the disadvantages of prior art arrangements.

In brief, a method and apparatus are provided for implementing in situ low flyheight warning in a direct access storage device (DASD). For each head in the DASD, a readback amplitude ratio is identified from two different disk radii. The initial ratio value is stored for each head in the DASD. During operation of the DASD, readback amplitude is monitored and an operating readback amplitude ratio is identified from two different disk radii. A change from the initial ratio value and the operating readback ratio is calculated and compared with a threshold value to identify a low-flying slider. A warning is generated responsive to the change value being greater than the threshold value.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
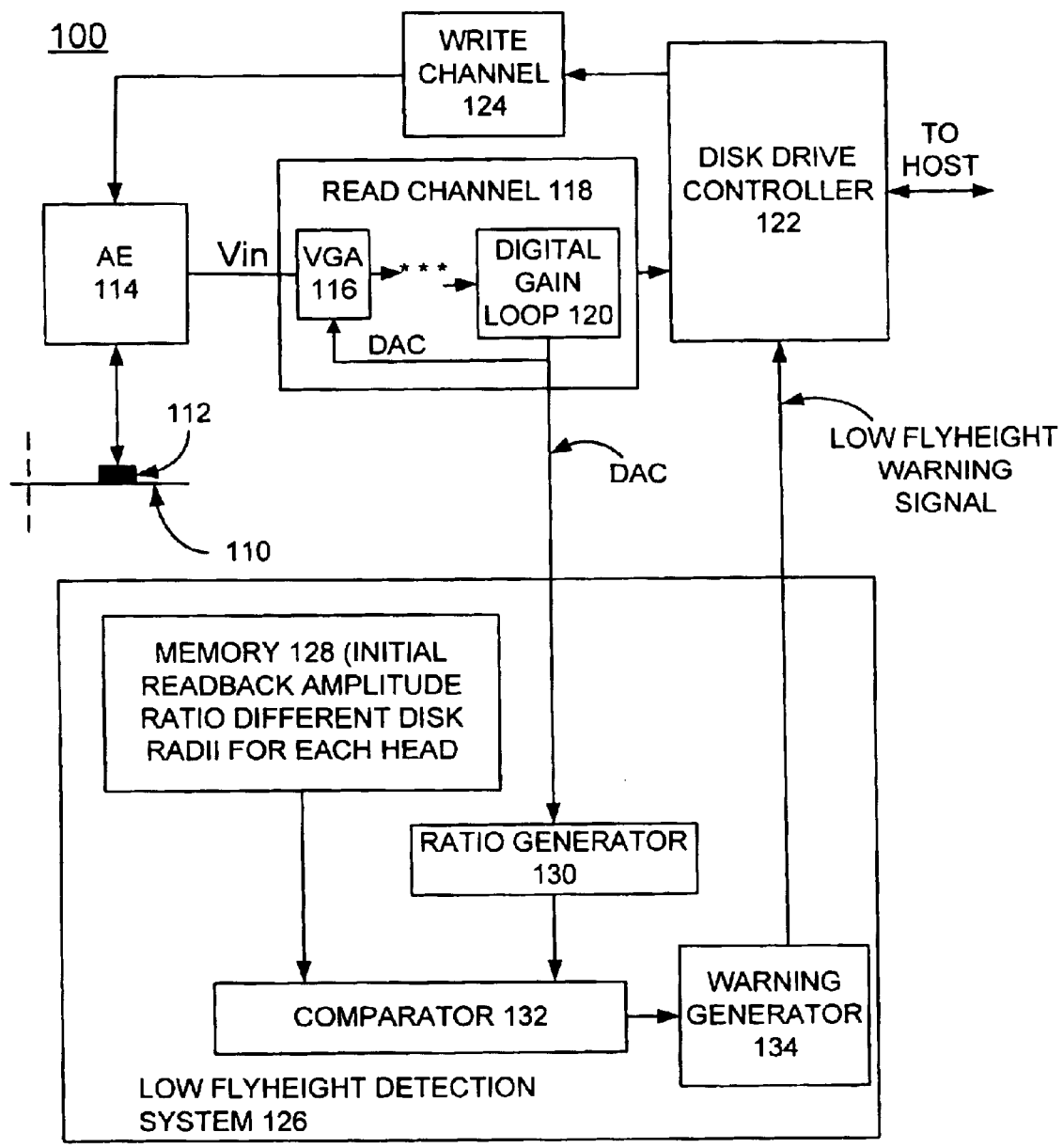
FIG. 1A is a block diagram representation illustrating a direct access storage device (DASD) for implementing in situ low flyheight warning in accordance with the preferred embodiment.

Having reference now to the drawings, in FIG. 1, there is shown a direct access storage device (DASD) or disk drive system for implementing methods for in situ detection of low-flying sliders of the preferred embodiment generally designated by the reference character 100. As shown in FIG. 1, DASD 100 includes a recorded disk 110 that is spun at constant speed and that is magnetically coated on both surfaces. Reference character 112 generally designates an assembly of a read/write head and an airbearing slider where the airbearing slider carries the read/write head. Read/write head of the slider/head assembly 112 is positioned over the top surface of the spinning disk 110 on a given track for reading data stored on that track and for writing data onto the spinning disk surface.

DASD 100 includes an arm electronic (AE) module 114 that serves two functions, a read function and a write function. In the read function, AE module 114 amplifies and provides high-pass filtering for a continuous readback signal from the read/write head of the slider/head assembly 112. The output of the AE module 114 is applied to a variable gain amplifier (VGA) 116 in a read channel 118. Read channel 118 includes a digital gain loop 120 providing a digital amplifier control (DAC) signal to the VGA 116. In read channel 118, the readback is decoded and converted into a binary data stream used by host system under the handshaking control of a disk drive controller 122.

In the write function, AE module 114 provides a binary current modulated signal to a thin film write head element of read/write head 112 for writing data onto the spinning disk 110. Under the control of the disk drive controller 122, a write channel 124 encodes and frequency modulates the customer data. The customer data to be stored on the spinning disk 110 is received from the host system.

In accordance with features of the preferred embodiment, DASD 100 includes a low flyheight detection system 126. The DAC signal is applied to and monitored by the low flyheight detection system 126. The low flyheight detection system 126 provides an in situ warning signal of low flyheight applied to the disk drive controller 122. Operation of the detection system 126 is illustrated and described in the process flow diagram of FIG. 2. The low flyheight detection system 126 includes a memory 128 for storing an intial readback amplitude ratio from two different disk radii for each head in the DASD, a ratio generator 130 monitoring the read channel, a comparator 132 comparing a change value between the operating readback amplitude ratio and the stored initial readback amplitude, and a warning generator 134 generating a low flyheight warning responsive to the compared change value being greater than a threshold value.

Figure 1B:
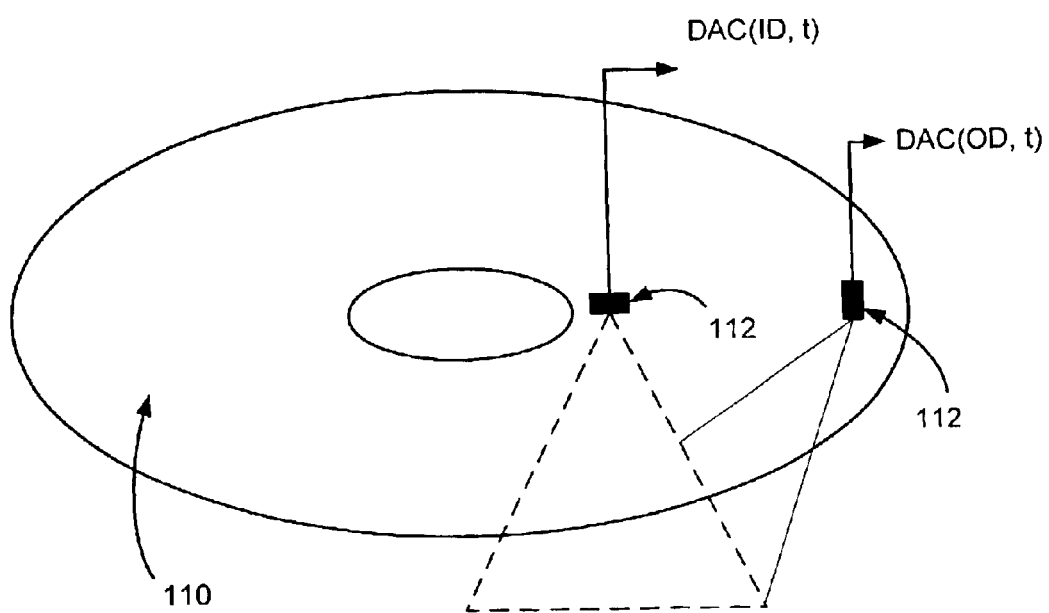
FIG. 1B is a diagram illustrating two slider positions at an inner diameter (ID) and an outer diameter (OD) of a disk of the DASD of FIG. 1 for monitoring a digital amplifier control (DAC) signal for implementing in situ low flyheight warning in accordance with the preferred embodiment.

Referring now to FIG. 1B, two positions of the slider/head assembly 112 at an inner diameter (ID) and an outer diameter (OD) of a disk 110 of the DASD 100 for monitoring the digital amplifier control (DAC) signal for implementing in situ low flyheight warning in accordance with the preferred embodiment. Respective digital amplifier control (DAC) signals are indicated as DAC(ID, t) and DAC(OD, t) for the illustrated slider/head assembly 112 at an inner diameter (ID) and an outer diameter (OD) of a disk 110.

In accordance with features of the invention, low flying heads are detected by comparing any sliding characteristics for at least two different disk radii, typically the largest and smallest disk radii. The invention solves the problem of detecting and warning for low-flying heads that are contacting the disk surface. While most disk drive makers employ heads that retain an air cushion between the sliders and disk surfaces, the day is quickly approaching when that cushion can not be guaranteed. In order to avoid excessive slider and disk wear, which can result in a head crash and loss of data, an in situ warning of low flyheight is provided.

In accordance with features of the invention, dedicated test sectors or tracks on the disk 110 are not required. This makes the invention easy to implement across various disk drive products. A second important advantage of the invention is that slider-disk contact can be detected independent of track misregistration (TMR). This is important as any slider-disk contact invariably creates TMR which causes an error in flyheight measurements when using current conventional methods, such as, GEM, CCD, and HRF. The reason for the error in conventional methods is that TMR reduces the signal amplitude for the test sectors. The reduced amplitude is falsely interpreted as a flying height change that is uncalibrated, that is the Wallace spacing loss relationship which provides a calibrated flyheight change based on readback signal amplitude cannot be relied upon.

In accordance with features of the invention, low flyheight is detected based upon the amplitude of the readback signal measured in the servo fields around a disk track. Since the servo information is radially continuous, unlike the data sectors, the amplitude of the readback signal stays constant when a read head is off-track. This is intentional. The position of a head relative to the track centerline on a disk is derived from servo burst information which is in turn taken from the amplitude of previously written servo information. By having radially seamless servo information, the head position can be easily determined. If the servo information was not radially continuous, for example, if the servo information was written at the same track pitch as data sectors, there would be a large dead-band between tracks. In these regions, no servo information would be available and following a track during reading and writing would be impossible.

Figure 2:
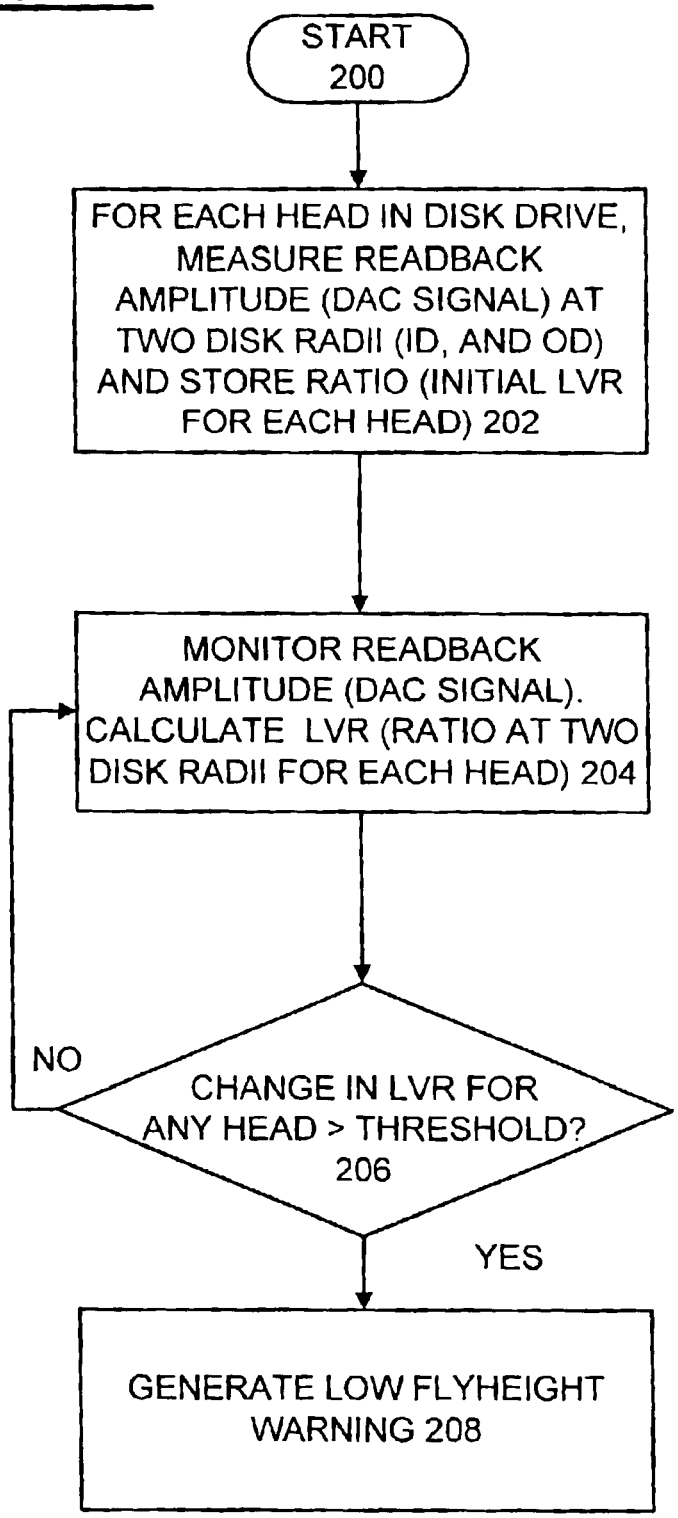
FIG. 2 is a flow chart illustrating exemplary sequential operations for implementing in situ low flyheight warning in the DASD of FIG. 1 in accordance with the preferred embodiment.

Referring now to FIG. 2, exemplary sequential operations for in situ detection of low flyheight in accordance with the preferred embodiment are shown. In situ detection of low-flying sliders starts with the operation of the invention begins by measuring the readback signal voltage amplitude for each head in a disk drive at some time, for example, at the time of drive manufacture. The amplitude is measured at two different disk radii and the ratio results, such as an initial natural logarithm of the ratio (LVR) for each head are stored as indicated in a block 202. During operation of the DASD 100, the amplitude of the readback signal, such as the DAC signal is monitored and a LVR value of the natural logarithm of the ratio at two disk radii is calculated as indicated in a block 204. Any change in the sequentially calculated LVR and the initial LVR for each head is compared with a threshold value as indicated in a decision block 206. When the change for any head is greater than the threshold value, then a low flyheight warning signal is generated as indicated in a block 208.

Since head amplitude is proportional to the exponential of head spacing, that is the Wallace spacing loss relationship, head spacing is proportional to the natural logarithm of the readback voltage. This fact is used to convert head amplitude change into head flying height change. Note that absolute head flying height cannot be measured based on readback amplitude. In this regard, flying height measurement is analogous to altitude measurement in an aircraft using barometric pressure. It is not possible to know the aircraft's absolute altitude based on the barometric pressure measured at the aircraft. One must know the barometric pressure at the ground in order to get absolute altitude above the ground. In a similar way, readback amplitude must be measured when a head is contacting a disk in order to get an absolute head flying height. For the invention to operate, it is not necessary to know the absolute head flying height and so all measurements are made at normal disk speed and local ambient pressure.

The reason that the invention uses more than one disk radii for the measurement may be understood as follows. A problem with using readback amplitude for head flying height change measurements is that the readback amplitude is temperature dependent. A significant cause is the gain sensitivity to temperature for the arm electronics (AE) 114. As AE temperature increases, its gain decreases which causes a reduction in the amplitude of the readback signal. Therefore, any increase in AE temperature will suggest that a head is flying higher from the lower readback amplitude. In reality, higher temperatures reduce the head flying height or the head-disk spacing due to protrusion of the read element. Testing has been performed with a disk drive with 12 heads placed on a temperature controlled plate. Both the conventional generalized error measurement (GEM) flyheight (FH) and readback amplitude were measured as the temperature of the drive was monitored. It is clear that using the readback signal to measure flying height change will not work in the real world where drive temperature might fluctuate more than 30 degrees C. over its life, for example, from 25° C. to 55° C. A 25° C. increase in temperature would appear to result in about a 13 nm FH increase if based on readback amplitude when in fact the head FH actually decreases by about 3 nm. However, using multiple track radii amplitude representative signals in accordance with the invention eliminates this large temperature sensitivity.

The readback amplitude in the servo field, for example, the servo automatic gain control (AGC) field, despite its extreme temperature sensitivity is used in accordance with the invention, because the servo readback amplitude is insensitive to TMR. Furthermore, the temperature sensitivity is eliminated when using the invention, resulting in a robust method for detecting head FH change in situ and may be further understood as follows.

The readback voltage obtained from a read head can be expressed as:

$$V(\lambda, HEAD, DISK, AE, R, T) = AE(T)*HEAD*DISK(R)*\exp(-2\pi d/\lambda)(1)$$

where AE is the gain of the AE 114 which is temperature (T), dependent, HEAD and DISK are the head and disk parameters which contribute to the readback amplitude, d is the head-disk spacing and $\lambda$ is the wavelength of the recorded pattern being read. HEAD parameters include such things as the width and the amount of bias current in the magnetoresistive (MR) read element. DISK parameters include the thickness and remanance of the magnetic coating. The properties of a disk are not uniform across its surface hence DISK is radius (R), dependent. To a small extent, both HEAD and DISK are also temperature dependent, but this is not important for the invention.

Now consider a given head and disk at two different radii, $R_1$ and $R_2$. Assuming the usual case where the servo frequencies are constant, the wavelengths corresponding to $R_1$ and $R_2$ will be $\lambda_1$ and $(R_2/R_1)\lambda_1$ respectively. Letting $V_1$ and $V_2$ represent the readback voltage at $R_1$ and $R_2$ respectively for a head with parameters: HEAD and at temperature T we can write the ratio of $V_1$ over $V_2$ as:

$$V_1/V_2 = \{DISK(R_1)/DISK(R_2)\}*\exp\{(2\pi/\lambda_1)*(d_2 R_1/R_2 - d_1)\} \quad (2)$$

The weighted difference between flying heights $d_1$ and $d_2$ can be found by taking the natural logarithm of equation 2 resulting in:

$$(R_1/R_2)d_2 - d_1 = (\ln(V_1/V_2) - \ln\{DISK(R_1)/DISK(R_2)\})/(2\pi/\lambda_1) \quad (3)$$

Since $R_1$ and $R_2$ are known, [3] gives the difference in head flying height for a head at radii $R_1$ and $R_2$ subject to the unknown ratio: DISK ($R_1$)/disk ($R_2$).

What is known about DISK($R_1$)/DISK($R_2$), however, is that this ratio should not change over time. So for all intents and purposes DISK($R_1$)/DISK($R_2$) is a constant. If we define $(R_1/R_2)d_2-d_1$ as $\Delta d$, ln $\{DISK(R_1)/DISK(R_2)\}$ as a constant D, and ln $(V_1/V_2)$ as LVR then equation 3 can be written as a change in $\Delta d$ at two different times, $t_1$ and $t_2$ as:

$$\Delta d(t=t_1) - \Delta d(t=t_2) = (\lambda_1/2\pi)(LVR(t=t_1) - LVR(t=t_2)) \quad (4)$$

We now have equation 4 that gives the difference in the flying height of a head at two different radii at two different times solely as a function of LVR, the natural logarithm of the ratio of readback voltages from the two radii. In accordance with features of the invention, low flyheight is detected based upon storing LVR for a given head and comparing it over time as a means to determine when a slider flying height difference between two disk radii has changed significantly.

The DAC signal can be represented by:

$$DAC = 255 - (20*\log(Vin/30))$$

A change in flyheight and the DAC signal can be represented by:

$$\Delta FH = (\lambda_1/2\pi)(\ln(Vin(t)) - \ln(Vin(t_0)))$$

$$\Delta DAC(R) = Constant*(FH(R, t) - FH(R, t_0))$$

The ratio of DAC signal at the ID and OD is proportional to a ratio of change in the FH and can be represented, for example, by:

$$\Delta DAC(ID)/\Delta DAC(OD) = \Delta IDFH/\Delta ODFH$$

Figure 3A:
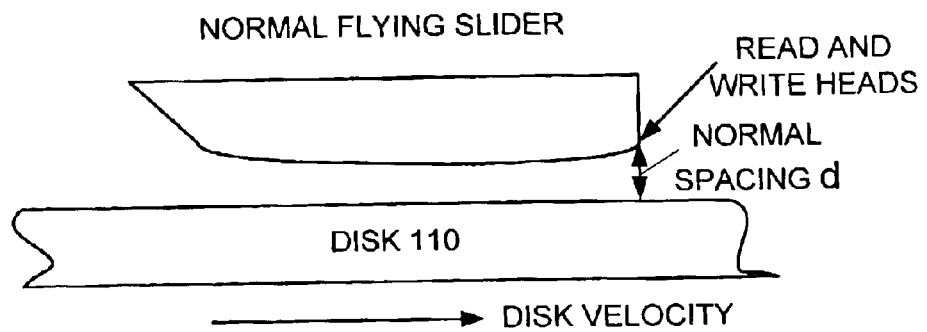
FIGS. 3A and 3B are diagrams respectively illustrating a spacing between the read and write heads on a slider and a disk surface in a direct access storage device (DASD) during normal flying and when in sliding contact for implementing in situ low flyheight warning in accordance with the preferred embodiment.
Figure 3B:
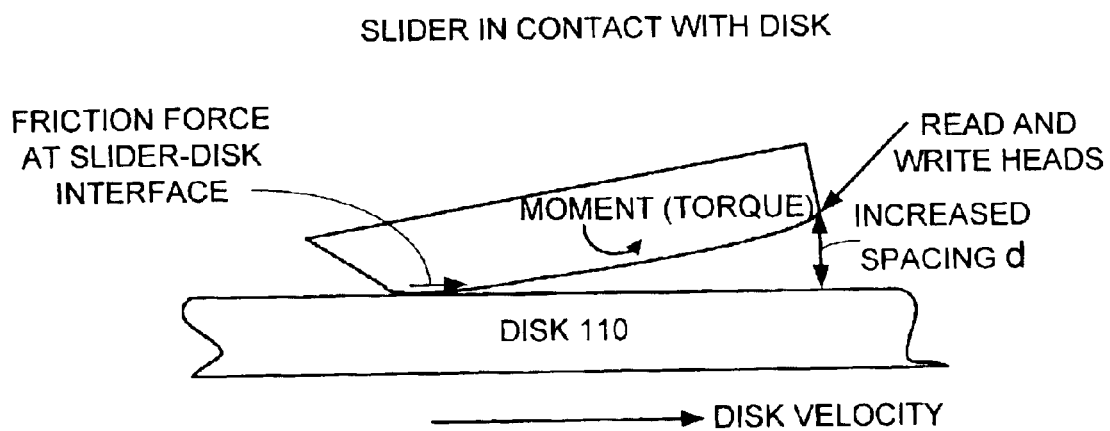

Having reference to FIGS. 3A and 3B, causes for a significant difference in flying height may be further understood. The interaction between a slider and disk during sliding contact is complex. There is, however, a phenomenon that occurs with all sliders that makes the invention workable. It is easily understood by examining FIG. 3B which shows a slider in contact with a spinning disk and the accompanying pitch moment that results from the friction force at the slider-disk interface. The pitch moment or torque rotates the slider such that the read element has increased separation d from the disk 110. The increased separation results in a decrease in the readback voltage. The amount of slider rotation and hence the amount of spacing increase will depend on the amount of positive crown or the convex shape of the slider's surface facing the disk 110, the friction force which in turn is a function of the amount of disk lubrication, disk roughness, and disk velocity and finally the slider's skew or angle of the longitudinal axis of a slider with respect to the tangent line at a given disk radius. The latter factors, the disk velocity and skew, typically have the greatest influence since the disk roughness and lubrication is fairly uniform and the crown is well controlled. As a result, there are significant differences in the sliding contact between say the inner and outer disk tracks. This has been verified experimentally.

As illustrated in FIGS. 3A and 3B, a spacing d exists between the read head on a slider and the disk surface. The spacing d during normal flying is shown in FIG. 3A and when in sliding contact in FIG. 3B. In the sliding contact case of FIG. 3B, the friction force due to contact at the slider-disk interface produces a moment that rotates the slider in a manner that increases the spacing d generally between the disk and the read and write heads.

In order to prove that the invention works, disk drives with special low-flying heads have been tested in a vacuum chamber. The vacuum chamber was used to slowly reduce the head flying heights while the head amplitudes were measured at both the inner and outer disk diameters (ID and OD). This was done to simulate a gradual reduction in flying height over time in a customer application. In order to simplify the data collection, the servo VGA gain measurement was made using the read channel at all 124 sector locations around a track. The individual sector measurements were then averaged in order to produce a track average VGA gain value. The average VGA gain was then converted to raw head amplitude. Flying height differences were then calculated using the above equation 4.

Figure 4:
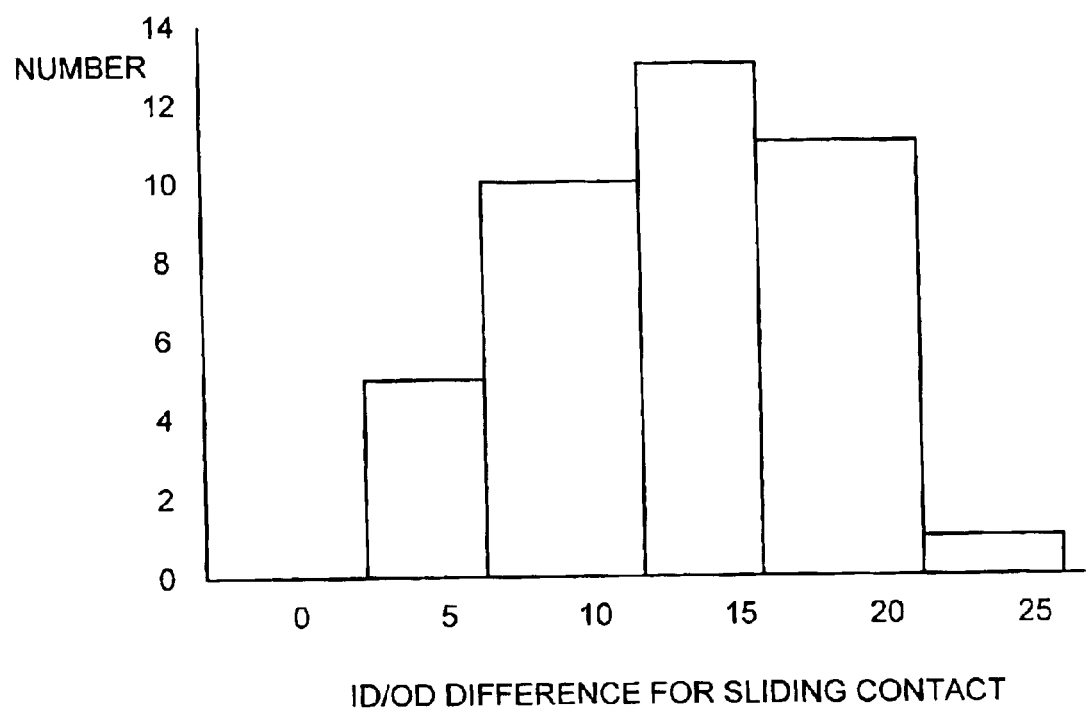
FIG. 4 is a chart histogram showing the ID/OD difference in head flying height when a slider is contacting the disk at either the ID or OD.

FIG. 4 provides a histogram of experimental results showing the ID/OD difference in head flying height when a slider is contacting the disk at either the ID or OD. Due to differences in the slider skew and disk speed at the ID and OD, there will always be differences in the ID and OD sliding contact dynamics which will cause an inflated difference in head flying height at the two radii. When a head is flying correctly, the ID/OD flying height difference is very small (usually less than a nanometer (nm)). In contrast, FIG. 4 shows very large flying height differences during contact. The x-axis in FIG. 4 corresponds to approximate nanometers of FH difference. FIG. 4 also shows that the range for flying height difference is quite large, for example, between 4 and 24. This should be compared, however, to an expected difference of less than 1 when a slider is flying correctly. The data in FIG. 4 was taken from multiple disk drives that were built with sliders which fly nominally about 10 nm. The vacuum level required for slider contact was between 0.6 and 0.3 Atmospheres.

Figure 5:
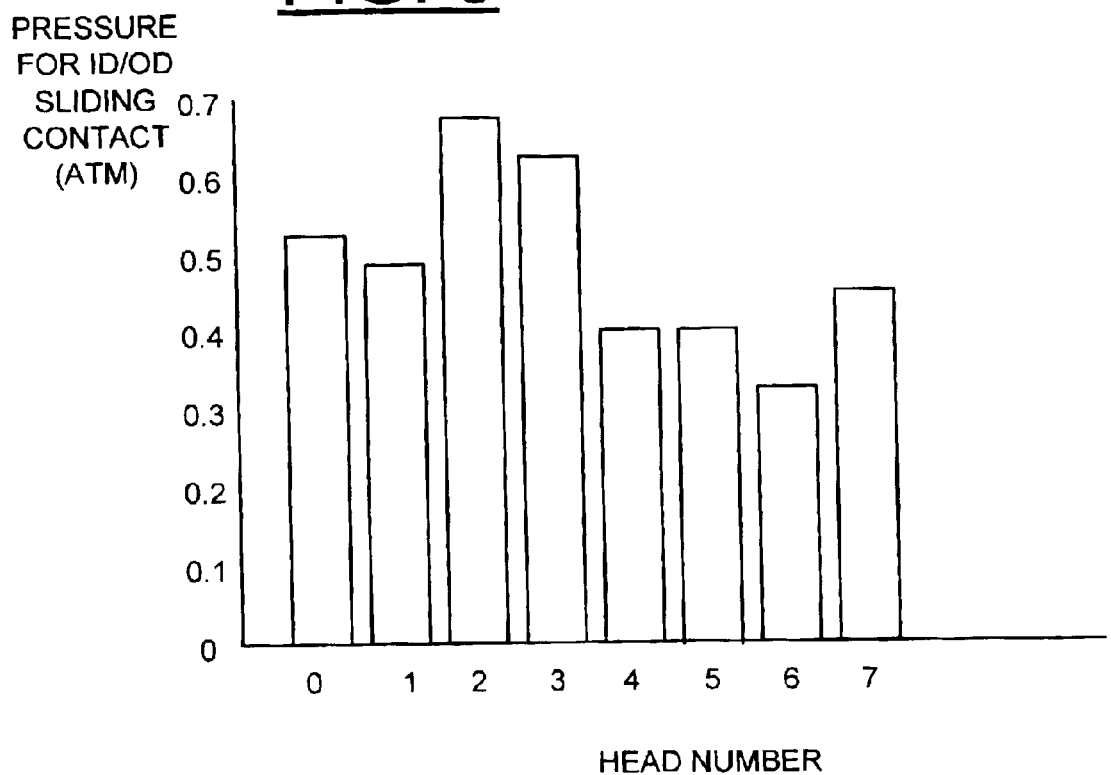
FIG. 5 is a chart illustrating ambient pressure in the vacuum chamber required to have sliding contact for multiple head numbers in a DASD of FIG. 1.

FIG. 5 illustrates the ambient pressure in the vacuum chamber required to have sliding contact based on the above-described calculations. The vacuum level required for sliding depends on the slider. This permits a ranking of slider-disk clearances since the reduced pressure, that is vacuum level required to cause sliding at either ID or OD, or both depends on the flying height of a slider at normal conditions. The pressure resulting in sliding contact at either the OD or ID or both is shown for one of the tested disk drives in FIG. 5. From FIG. 5, heads 4, 5 and 6 have the highest nominal flying height since they require the lowest pressure in order to achieve sliding contact at OD or ID. Heads 2 and 3 are nominally lower flying heads.

Figure 6:
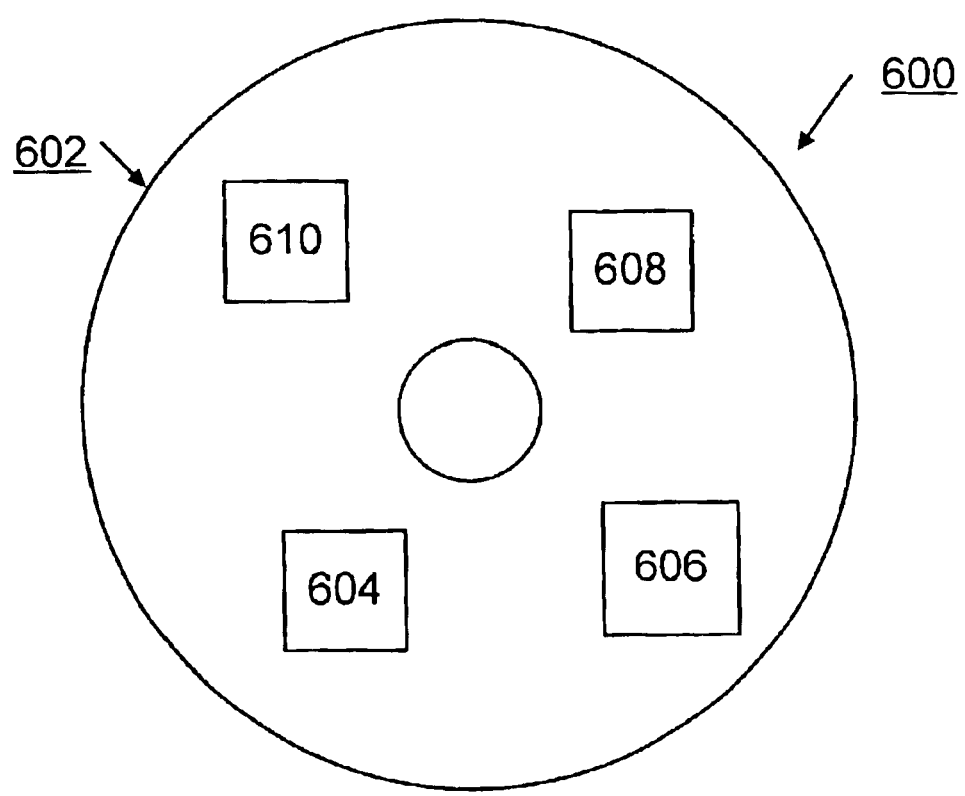
FIG. 6 is a block diagram illustrating a computer program product in accordance with the preferred embodiment.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a transmission type media such as a digital or analog communications link, or a similar computer program product. Recording medium 602 stores program means 604, 606, 608, 610 on the medium 602 for carrying out the in situ low flyheight warning methods for of the preferred embodiment in the DASD 100 of FIG. 1A.

A sequence of program instructions or a logical assembly of one or more interrelated modules defined by the recorded program means 604, 606, 608, 610, direct the DASD 100 for in situ implementing low flyheight warning of the preferred embodiment.

While the present invention has been described with reference to the details of the embodiments of the invention shown in the drawing, these details are not intended to limit the scope of the invention as claimed in the appended claims.

What is claimed is:

1. A method for implementing in situ low flyheight warning in a direct access storage device (DASD) comprising the steps of:
   for each head in the DASD, identifying and storing an initial readback amplitude ratio from two different disk radii including for each head in the DASD, identifying a ratio of a digital amplifier control (DAC) signal applied to a variable gain amplifier (VGA) coupled to a read head from two different disk radii;
   during operation of the DASD, monitoring readback amplitude and sequentially identifying an operating readback amplitude ratio from two different disk radii;
   sequentially calculating a change value between said initial ratio value and said operating readback ratio;
   sequentially comparing said change value with a threshold value to identify a low-flying slider; and
   generating a low flyheight warning responsive to the compared change value being greater than the threshold value.

2. A method for implementing in situ low flyheight warning as recited in claim 1 wherein the steps during operation of the DASD, of monitoring readback amplitude and sequentially identifying an operating readback amplitude ratio from two different disk radii includes the steps of monitoring readback amplitude and sequentially identifying an operating readback amplitude ratio from an inner disk track and an outer disk track.

3. A method for implementing in situ low flyheight warning as recited in claim 1 wherein the steps during operation of the DASD, of monitoring readback amplitude and sequentially identifying an operating readback amplitude ratio from two different disk radii includes the steps of identifying a ratio of a natural logarithm of a readback voltage obtained from a read head from two different disk radii.

4. A method for implementing in situ low flyheight warning in a direct access storage device (DASD) comprising the steps of;
   for each head in the DASD, identifying and storing an initial readback amplitude ratio from two different disk radii;
   during operation of the DASD, monitoring readback amplitude and sequentially identifying an operating readback amplitude ratio from two different disk radii including identifying a ratio of a digital amplifier control (DAC) signal applied to a variable gain amplifier (VGA) coupled to a read head from two different disk radii;
   sequentially calculating a change value between said initial ratio value and said operating readback ratio;
   sequentially comparing said change value with a threshold value to identify a low-flying slider; and
   generating a low flyheight warning responsive to the compared change value being greater than the threshold value.

5. A method for implementing in situ low flyheight warning as recited in claim 4 wherein the steps for each head in the DASD, of identifying and storing an initial readback amplitude ratio from two different disk radii includes the steps for each head in the DASD, of identifying a ratio of a natural logarithm of a readback voltage obtained from a read head from two different disk radii.

6. A method for implementing in situ low flyheight warning as recited in claim 4 wherein the steps for each head in the DASD, of identifying and storing an initial readback amplitude ratio from two different disk radii includes the steps for each head in the DASD, of identifying and storing an initial readback amplitude ratio from an inner disk track and an outer disk track.

7. Apparatus for implementing in situ low flyheight warning in a direct access storage device comprising:
   a memory storing an initial readback amplitude ratio from two different disk radii for each head in the DASD; said initial readback amplitude ratio including an initial ratio of a digital amplifier control (DAC) signal applied to a variable gain amplifier (VGA) coupled to a read head from said two different disk radii
   a ratio generator monitoring a read channel for processing readback amplitude data and generating an operating readback amplitude ratio from two different disk radii;
   a comparator comparing a change value between said operating readback amplitude ratio and said stored initial readback amplitude ratio for each head in the DASD with a predefined threshold value to identify a low-flying slider; and
   a warning generator generating a low flyheight warning responsive to the compared change value being greater than the threshold value.

8. Apparatus for implementing in situ low flyheight warning in a direct access storage device as recited in claim 7 wherein said operating readback amplitude ratio includes an operating ratio of a natural logarithm of a readback voltage obtained from a read head from said two different disk radii.

9. Apparatus for implementing in situ low flyheight warning in a direct access storage device comprising:
   a memory storing an initial readback amplitude ratio from two different disk radii for each head in the DASD;

a ratio generator monitoring a read channel for processing readback amplitude data and generating an operating readback amplitude ratio from two different disk radii; said operating readback amplitude ratio including an operating ratio of a digital amplifier control (DAC) signal applied to a variable gain amplifier (VGA) coupled to a read head from said two different disk radii;

a comparator comparing a change value between said operating readback amplitude ratio and said stored initial readback amplitude ratio for each head in the DASD with a predefined threshold value to identify a low-flying slider; and a warning generator generating a low flyheight warning responsive to the compared change value being greater than the threshold value.

10. Apparatus for implementing situ low flyheight warning in a direct access storage device as recited in claim 9 wherein said initial readback amplitude ratio from two different disk radii for each head in the DASD includes an initial ratio of a natural logarithm of a readback voltage obtained from a read head from said two different disk radii.

11. A computer program product for implementing in situ low flyheight warning in a direct access storage device including a low flyheight detection system, said computer program product including a plurality of computer executable instructions stored on a computer readable medium, wherein said instructions, when executed by said low flyheight detection system, cause the low flyheight detection system to perform the steps of:

for each head in the DASD, identifying and storing an initial readback amplitude ratio from two different disk radii including for each head in the DASD, identifying a ratio of a digital amplifier control (DAC) signal applied to a variable gain amplifier (VGA) coupled to a read head from two different disk radii;

during operation of the DASD, monitoring readback amplitude and sequentially identifying an operating readback amplitude ratio from two different disk radii;

sequentially calculating a change value between said initial ratio value and said operating read back ratio;

sequentially comparing said change value with a threshold value to identify a low-flying slider; and generating a low flyheight warning responsive to the compared change value being greater than the threshold value.

* * * * *